(12) United States Patent
Himmel

(10) Patent No.: US 12,311,819 B2
(45) Date of Patent: May 27, 2025

(54) COVER FOR FOLD-UP VEHICLE SEATS

(71) Applicant: Brandon Himmel, San Marcos, CA (US)

(72) Inventor: Brandon Himmel, San Marcos, CA (US)

( * ) Notice: Subject to any disclaimer, the term of this patent is extended or adjusted under 35 U.S.C. 154(b) by 0 days.

(21) Appl. No.: 18/755,105

(22) Filed: Jun. 26, 2024

(65) Prior Publication Data

US 2024/0409015 A1 Dec. 12, 2024

Related U.S. Application Data

(63) Continuation of application No. 18/418,059, filed on Jan. 19, 2024, now Pat. No. 12,024,077, which is a continuation-in-part of application No. 18/331,028, filed on Jun. 7, 2023, now Pat. No. 12,221,024.

(51) Int. Cl.
| | |
|---|---|
| *B60N 2/60* | (2006.01) |
| *A01K 1/02* | (2006.01) |
| *B32B 5/02* | (2006.01) |
| *B32B 5/26* | (2006.01) |
| *B60R 13/02* | (2006.01) |

(52) U.S. Cl.
CPC ............ *B60N 2/6027* (2013.01); *B32B 5/024* (2013.01); *B32B 5/26* (2013.01); *B60N 2/6009* (2013.01); *B60R 13/0206* (2013.01); *A01K 1/0272* (2013.01); *B32B 2571/00* (2013.01)

(58) Field of Classification Search
CPC .. B60N 2/6009; B60N 2/6027; B60N 2/6018; A01K 1/0272; B60R 13/0206; B32B 2571/00

See application file for complete search history.

(56) References Cited

U.S. PATENT DOCUMENTS

| | | | |
|---|---|---|---|
| 4,943,105 | A | 7/1990 | Kacar |
| 5,215,345 | A | 6/1993 | Orphan |
| 5,419,602 | A | 5/1995 | VanHoose |
| 7,287,813 | B2 | 10/2007 | Aliev |

(Continued)

FOREIGN PATENT DOCUMENTS

WO   WO 2007096822 A1   8/2007

OTHER PUBLICATIONS

Written Opinion of the International Searching Authority for PCT/US2024/030969 established by the ISA/US completed on Aug. 26, 2024.

(Continued)

*Primary Examiner* — Milton Nelson, Jr.
(74) *Attorney, Agent, or Firm* — Goldstein Law Offices, P.C.

(57) ABSTRACT

A cover for a seating and/or cargo area and doors of a vehicle includes front, middle and rear panels or portions. Door panels are attached to an upper portion of left and right sides of the front panel. Left and right front straps are spaced apart and attached to the front panel. Rear straps are attached to the rear panel. Window inserts are attachable to the left and right side door panels. For vehicles having fold-up seats, the cover may include a rear panel having independently foldable first, second, and optionally third sections attached by a zipper, and split seat top clips on opposite sides of the zipper. First and second top seats straps are attached on opposite sides of the rear panel. The fold-up seats, which may be split or un-split seats, may be folded up or down, without displacing or removing the cover.

22 Claims, 15 Drawing Sheets

(56) References Cited

U.S. PATENT DOCUMENTS

| | | |
|---|---|---|
| 8,091,513 B1 | 1/2012 | Garcia |
| 9,610,877 B2 | 4/2017 | Umlauf |
| 9,845,033 B1 | 12/2017 | Umlauf |
| D851,963 S | 6/2019 | Fischer-Livneh |
| D868,503 S | 12/2019 | Fu |
| D880,198 S | 3/2020 | Umlauf |
| D883,716 S | 5/2020 | Hu |
| D904,798 S | 12/2020 | Cameron |
| 10,960,798 B1 | 3/2021 | Li |
| D923,974 S | 7/2021 | Xu |
| D932,215 S | 10/2021 | Zheng |
| D946,314 S | 3/2022 | Xiao |
| D946,313 S | 4/2022 | Xiao |
| 11,485,210 B1 | 11/2022 | Camarillo |
| D1,005,742 S | 11/2023 | Li |
| 11,844,328 B2 | 12/2023 | Pan |
| D1,024,623 S | 4/2024 | Zhou |
| 2005/0253444 A1 | 11/2005 | Godshaw |
| 2007/0194589 A1 | 8/2007 | Aliev |
| 2008/0179926 A1 | 7/2008 | Kushner |
| 2009/0091165 A1 | 4/2009 | Thompson |
| 2015/0264887 A1 | 9/2015 | Parness |
| 2019/0106034 A1 | 4/2019 | Leon Guerrero et al. |
| 2021/0086670 A1 | 3/2021 | Kozlowski et al. |
| 2022/0061264 A1 | 4/2022 | Pan |

OTHER PUBLICATIONS

International Preliminary Report on Patentability of the International Preliminary Examining Authority for PCT/US2024/030969 established by the IPEA/US completed on Aug. 26, 2024.
Photos and descriptive illustrations of vehicle seat and door cover in multiple sizes from RUFF Liners, Year: 2022, 5 pages.

COVER FOR FOLD-UP VEHICLE SEATS

CROSS REFERENCES AND RELATED SUBJECT MATTER

This continuation application claims the benefit of priority of U.S. patent application Ser. No. 18/418,059, filed Jan. 19, 2024, which is a Continuation-In-Part of U.S. application Ser. No. 18/331,028 filed Jun. 7, 2023, the contents of which are relied upon and incorporated herein by reference in their entirety. The entire disclosure of any publication or patent document mentioned herein is entirely incorporated by reference.

BACKGROUND OF THE INVENTION

Various vehicle seat and cargo area covers have been proposed or used in the past, especially for transporting a pet, such as a dog. Dogs may move around in the vehicle, which can displace the cover and defeat the purpose of the installing the cover. Dogs may also scratch or chew on exposed interior surfaces of the vehicle, for example the windowsills or doors. Dogs may also have a tendency to try to climb into the front of the vehicle. Some known covers designed for dogs or other pets may leave certain interior vehicle surfaces exposed, may not consistently remain in place as desired, or they may be difficult to install and use. Other known covers only fit well in certain types or sizes of vehicles, or are not useable on split seats. As a result, existing covers have met with varying degrees of success. Accordingly, engineering improvements are needed in the design of vehicle seat and cargo area covers.

SUMMARY OF THE INVENTION

A cover for a seating and/or cargo area and doors of a vehicle includes a front panel or portion and a rear panel or portion attached to a middle panel or portion. The cover may have seat belt openings in at least one of, or between, the middle panel and the rear panel. A left side door panel is attached to an upper portion of a left side of the front panel, and a right side door panel is attached to an upper portion of a right side of the front panel. Left and right front straps are spaced apart and attached to the front panel. Rear straps are attached to the rear panel. Left and right window inserts are attachable to the left and right side door panels. The cover protects interior surfaces of the vehicle while allowing the doors to open and close without substantially displacing the cover.

In an alternative design for vehicles having fold-up seats, the cover may include a rear panel having independently foldable first, second, and optionally third sections attached by a zipper, and split seat top clips on opposite sides of the zipper. First and second top seats straps are attached on opposite sides of the rear panel. The fold-up seats, which may be split or un-split seats, may be folded up or down, without displacing or removing the cover.

BRIEF DESCRIPTION OF THE DRAWINGS

In the drawings, the same reference number indicates the same element in each of the views.

DETAILED DESCRIPTION

Figure 1:
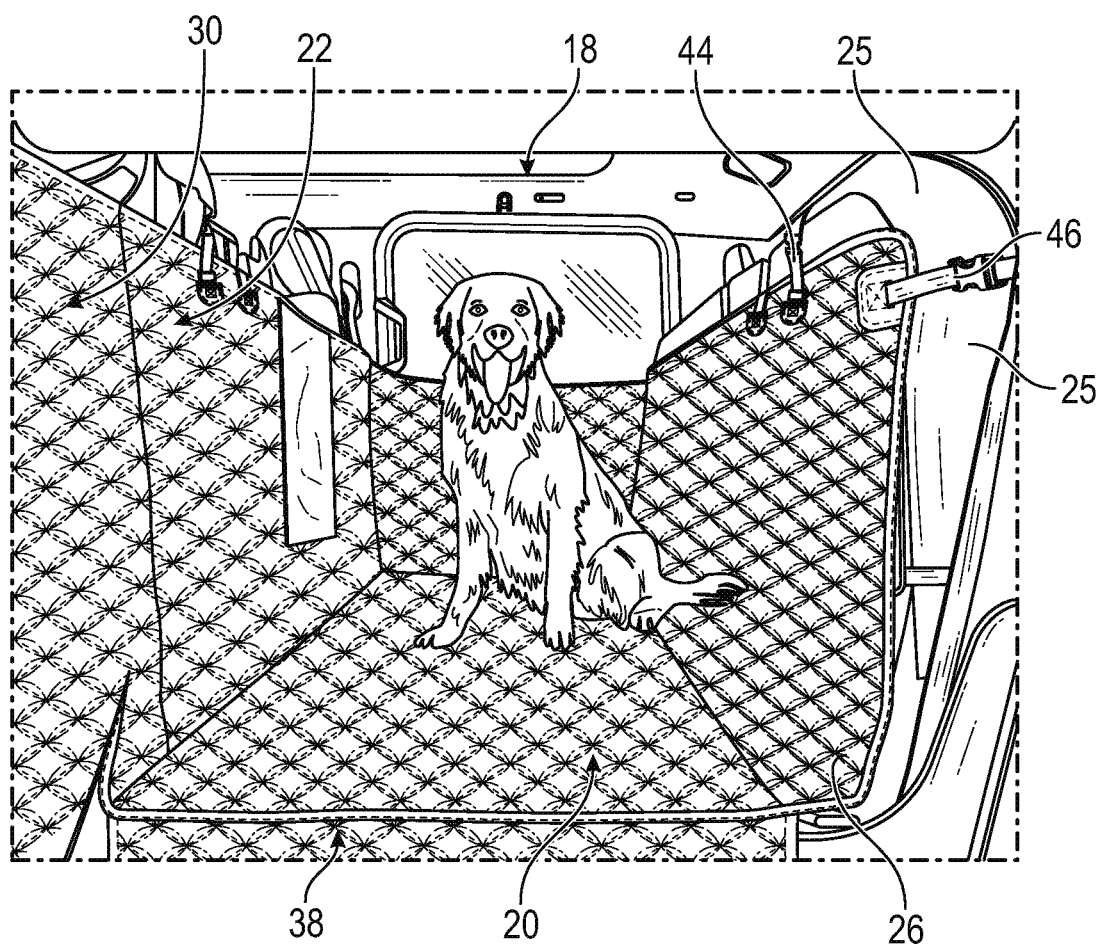
FIG. 1 is a perspective view of a vehicle seating or cargo area and door cover installed on a folded up rear seat or an interior cargo area of a pickup truck.
Figure 2:
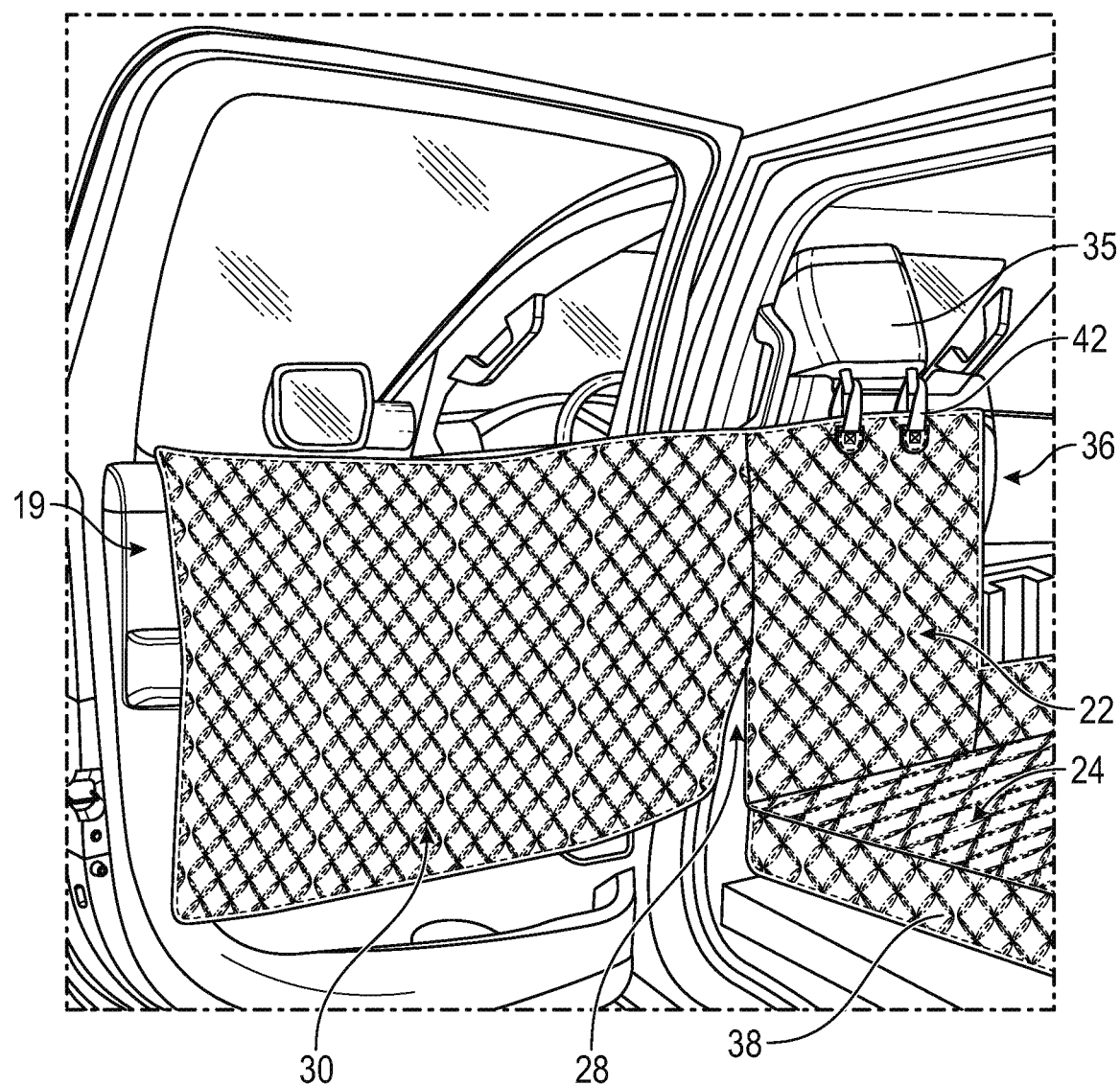
FIG. 2 is a perspective view of the cover of FIG. 1 showing the left door panel installed on the rear left side door of a pickup truck.
Figure 3:
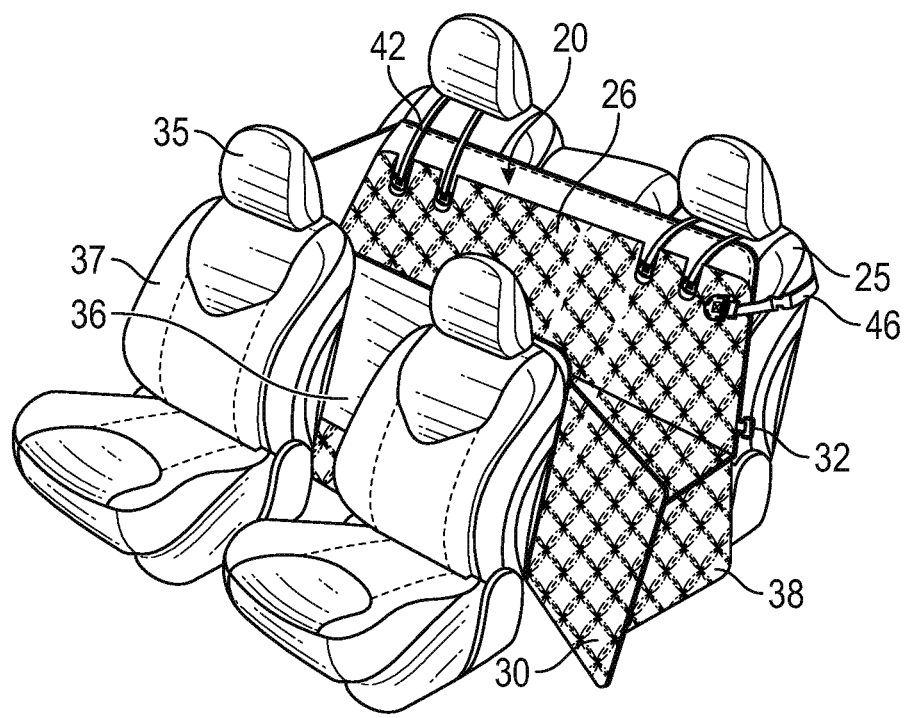
FIG. 3 is a perspective view of installation of the cover shown in FIGS. 1 and 2, now installed on a rear vehicle seat.
Figure 4:
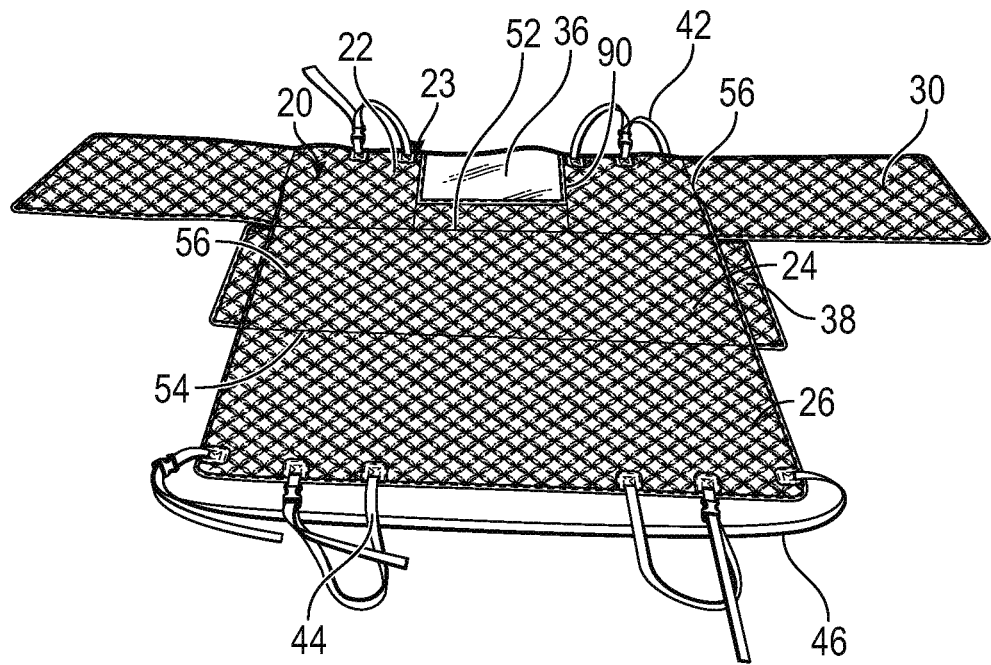
FIG. 4 is a top perspective view of the cover of FIGS. 1 and 2 unfolded and laid out flat.

Referring to FIGS. 1-4, a cover 20 is provided for a seat 25 and/or interior cargo area and rear doors 19 of a vehicle 18. FIGS. 1, 2 and 3 show the cover 20 installed in the second or back seat of a four-door pickup truck. However, the cover 20 may also be designed for use in other vehicles as well, such as SUV's, sedans and coupes. As shown in FIG. 4, the cover 20 may be described as having a front panel 22 attached to or integral with a middle panel 24, and a rear panel 26 similarly attached to or integral with the middle panel 24. Left and right side panels 30 are attached to or integral with left and right sides of the front panel 22. Side flaps 38 are similarly provided at the left and right sides of the middle panel 24. The front, middle and rear panels may be rectangular, with a width (in the left/right direction) generally selected to fit the interior space of the vehicle 18.

Figure 9:
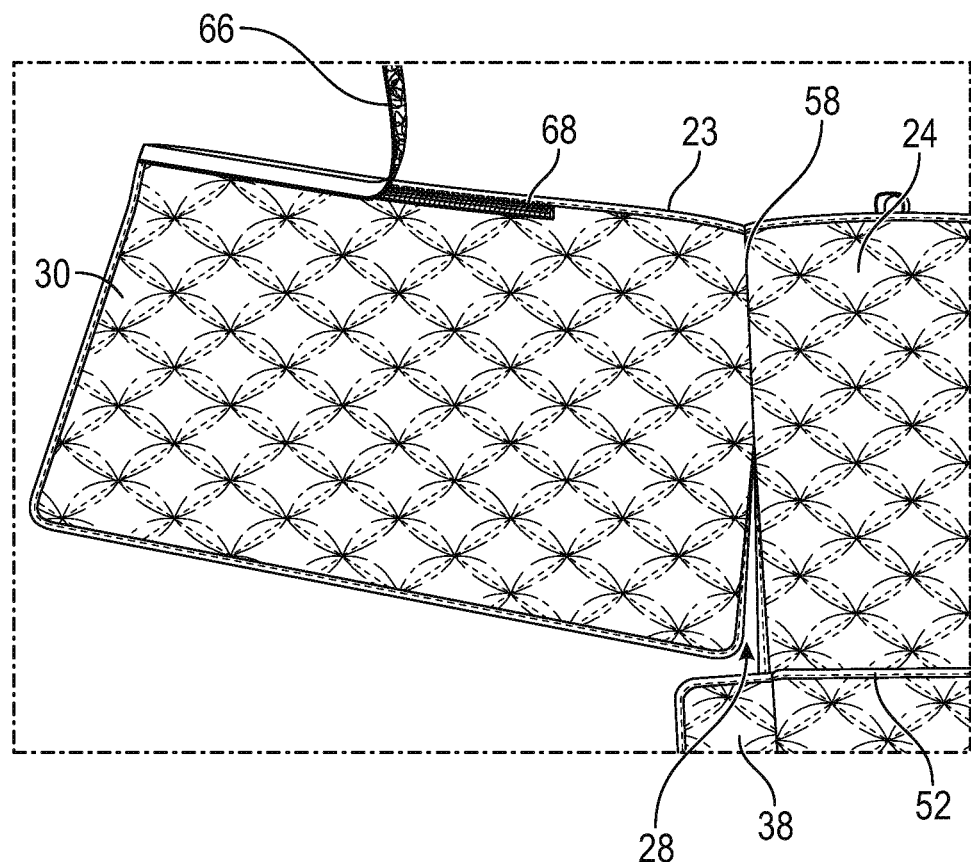
FIG. 9 is a bottom view of the right side door panel of the cover shown in FIGS. 5 and 6.

Referring again to FIG. 4, the cover may be described as having the front panel 22 attached to the middle panel 24 along a front lateral seam or fold line 52, with the rear panel 26 similarly attached to the middle panel 24 along a rear lateral seam or fold line 54, which is parallel to fold line 52. The cover may also be described as having the side panels 30 attached to the sides of the front panel 22 along left and right longitudinal seam or fold line segments 56, and the side flaps 38 attached to the sides of the middle panel 24 along left and right longitudinal seam or fold lines 58. As shown in FIGS. 2 and 9, the line segments 56, or the attachment of the side panels 30 to the front panel 22, extend only partially down from the top edge 23 of the cover 20, leaving a gap or slit 28 between the lower approximately ⅓ to ½ of the side panel 30 and the middle panel 24. Consequently, the lower portion of each side panel 30 is not attached to the front panel 22. This allows the side panels 30 to more easily pivot or shift vertically relative to the front panel 22. The side panels 30 can then be positioned more easily over the vehicle doors 19, without excessive bulging.

The fold lines 52, 54, 56 and 58 are geometric locations on the cover 20 used for purpose of description and may not be visible or present on the cover itself, that is fold lines having no physical difference from the rest of the cover material. In some designs, the fold lines may be actual stitched seams, or thinner section allowing the material of the cover 20 to be more easily folded along a straight line. The cover may be symmetrical about a longitudinal center line. Correspondingly, the panels described above may alternatively be described as areas or portions, as the cover need not have any visibly individual panels.

The cover 20 may include a top layer of waterproof liner made of 600D Oxford cloth with a PVC coating, a soft polyester fill middle layer, and a 190T Oxford cloth bottom layer. These layers may be attached via heat pressing or heat stamping. Heating pressing or heat stamping avoids the needle holes associated with sewing, which increases the water resistance of the cover. Heat pressing provides the quilted texture shown in FIG. 4. The panels may be attached together by sewing at the edges of the panels, where needle holes are less significant.

Figure 5:
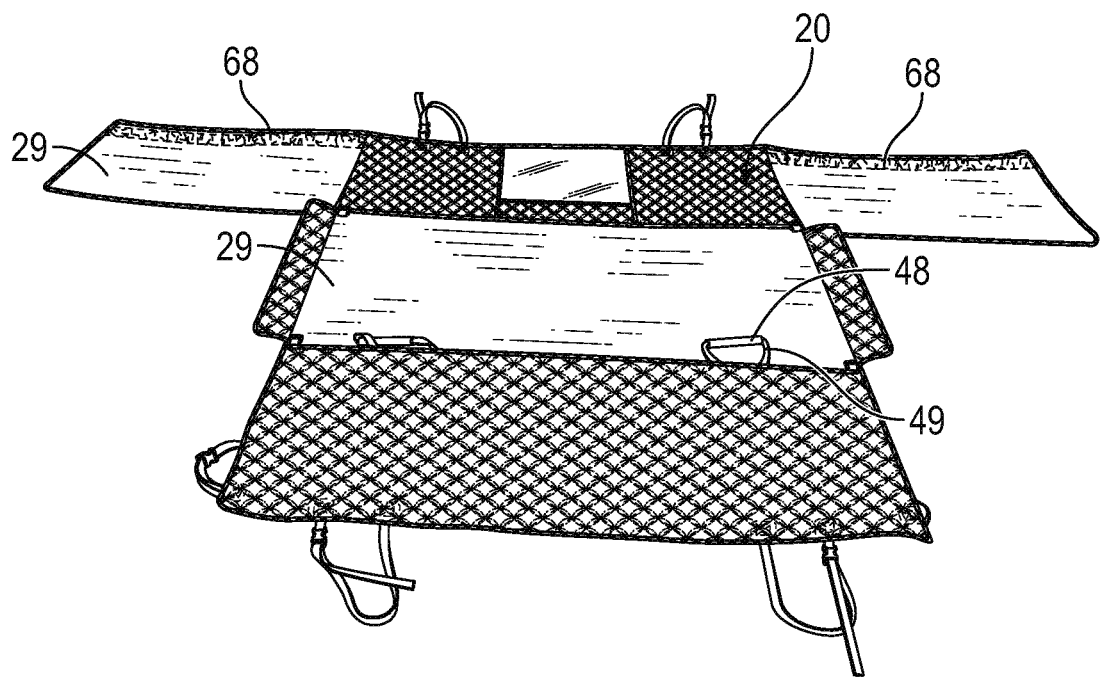
FIG. 5 is a bottom perspective top view of the cover of as shown in FIG. 4.

The cover 20 is soft and flexible and may be folded or rolled up into a compact size for transport or storage. Referring to FIG. 5, soft non-slip grip material 29 may be provided around the perimeter of the bottom of the bottom layer of the middle panel 24, and/or around the perimeter of the side panels 30 to reduce sliding movement between the cover 20 and interior surfaces of the vehicle. When used around the perimeter of the panels, the grip material 29 may be sewn onto the other layers of the cover. If used, the non-slip grip material 29 may alternatively be provided as an entire bottom layer, or as patches on the bottom of the cover 20. The non-slip grip material may be non-adhesive PVC tufted foam liner, polyester with patterned PVC dots, rubber netting fabric As shown in FIGS. 1-5, first and second, or left and right front straps 42 are attached to the front panel and configured to extend around the posts of left and right head rests 35 of the vehicle 18 to hold up the front panel 22. Rear straps 44 are attached to the rear panel and configured to secure the rear panel to an interior of the vehicle, for example by extending around the posts of head rests 35 in the rear seat of the vehicle. The ends of a lateral strap 46, if used, are attached to the rear corners of the rear panel 26, with the lateral strap extending around a folded up rear seat 25 of the vehicle, as shown in FIG. 1. As both the rear straps 44 and the lateral strap 46 hold the rear panel 26, either may be omitted in some designs, while other designs use both.

As shown in FIGS. 1, 2 and 3, a window 36 may be provided at a center of the front panel 22, extending from the top edge 23 of the front panel 22 across about one half or three quarters of the length of the front panel 22. The window 36 may be a screen or mesh material, to reduce obstructing air flow in the interior of the vehicle. The sides of the window 36 may be attached to the front panel 22 by zippers 90, to allow the window 36 to be folded down. As shown in FIGS. 1, 2 and 3, the window 36 is sized and positioned on the cover 20 so that when the cover is installed, the window 36 is located between the front seats 37.

FIG. 5 shows flexible fabric or cord anchor loops 49 joined to the bottom surface of the cover 20 may extend through rigid anchor tubes 48. The anchor tubes 48, if used, can be pushed between a seat and a seat back of the vehicle, to help hold the cover 20 in place. The bottom surface of the cover 20 may have a color, texture or stitch pattern different from the top surface, to clearly indicate the top and bottom surfaces.

Figure 6:
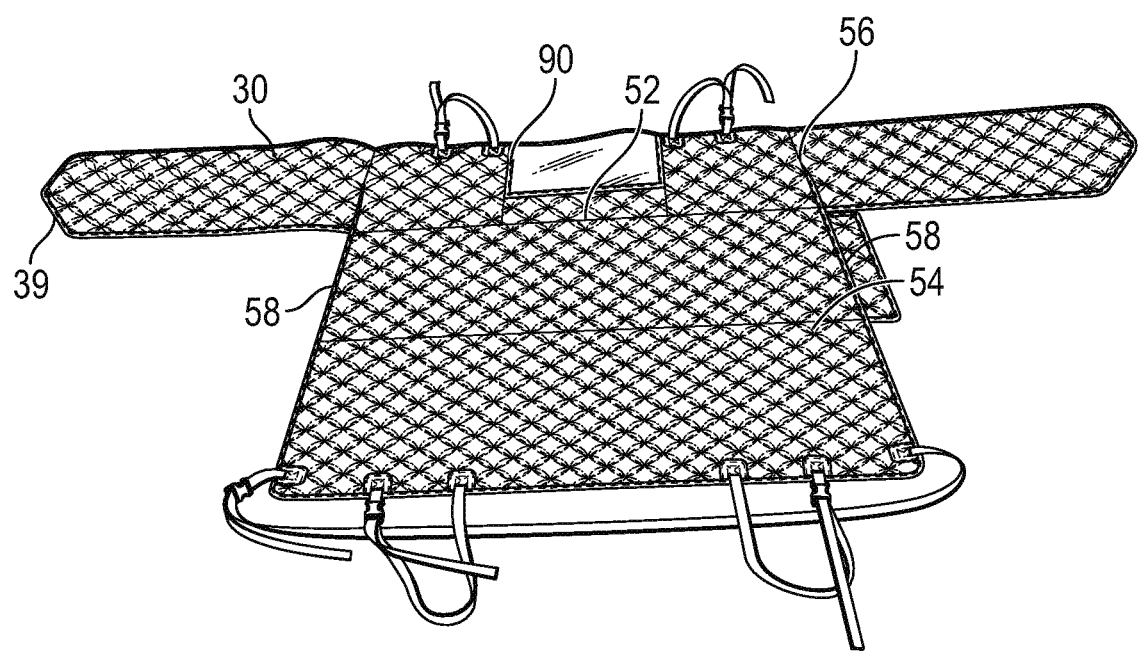
FIG. 6 is top perspective view of an alternative cover with highlighted design details and cover kit components.

FIG. 6 shows an alternate cover 21 intended for use in vehicles smaller than a standard pickup truck. The design of the cover 21 may be the same as the cover 20 described above, but with the dimensions of the cover 21 proportionally less than the dimensions of the cover 20. In addition, the side panels 30 of the cover 21 may have an angled lower edge 39.

Figure 7:
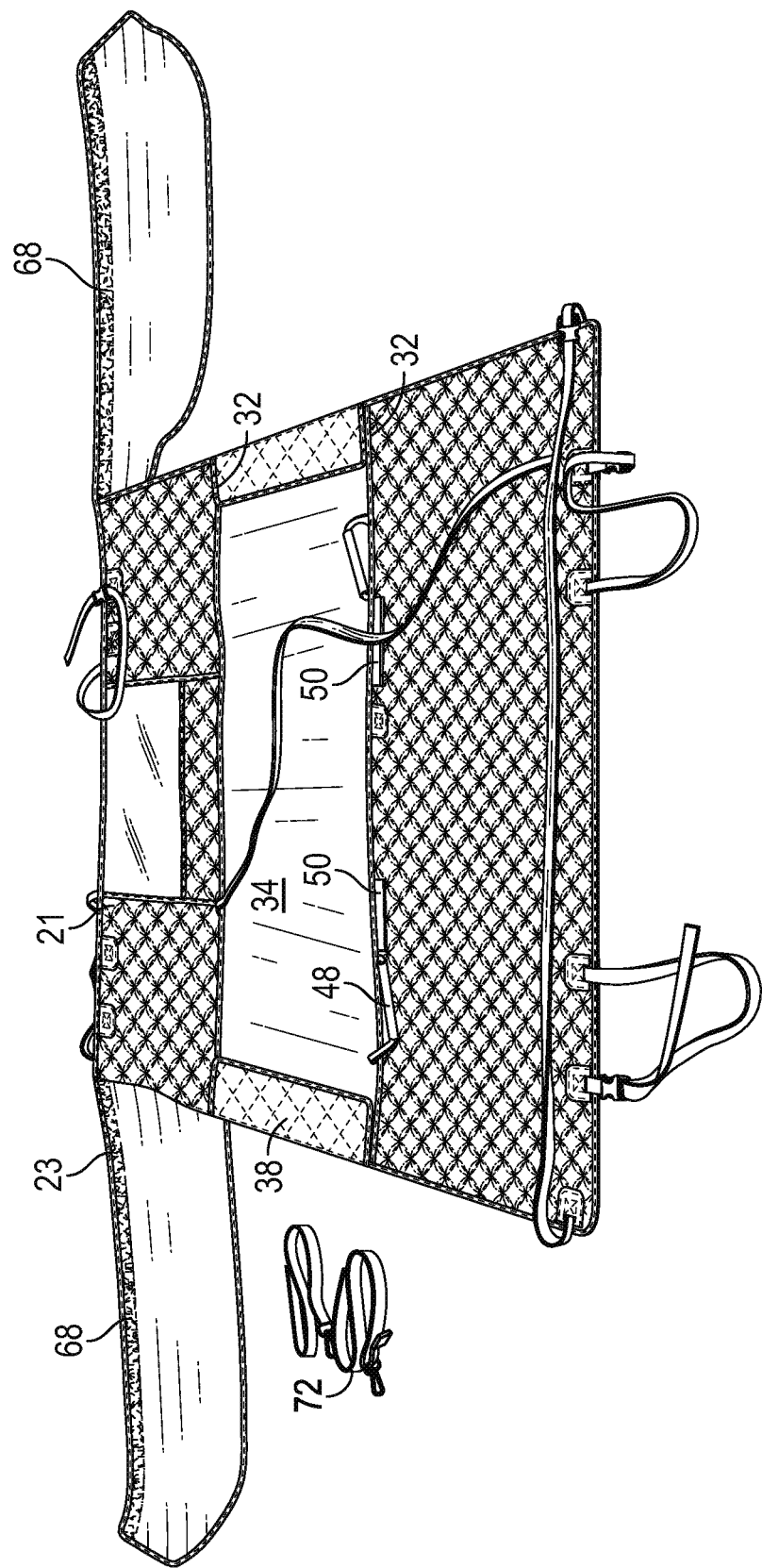
FIG. 7 is a bottom perspective view of the alternative cover shown in FIG. 6.

FIGS. 1-4 show a size Large cover 20 designed for a full size extended cab pickup truck or a large SUV, with the middle/rear seats folded up or down. a standard pickup truck or large SUV. FIGS. 6 and 7 show a size Medium cover 21 designed for passenger cars, small SUV's and small extended cab pickup trucks. Referring to FIGS. 4 and 6, the width (from left to right) of the front, middle and rear panels of the covers 20 and 21 may be about 143 cm to 163 cm (nominally 153 cm), and 123 cm to 143 cm (nominally 133 cm), respectively. The width of the side panels 30 of the cover 20 and of the upper portion of the cover 21 (above the angled edge 39) may both be about 90 cm to 110 cm (nominally 100 cm). The minimum width of the side panels at the angled edge 39 may be about 70 cm to 90 cm (nominally 80 cm). Preferably, the ratio of the width of the side panel 30 to the width of the front panel is 0.62 to 0.68 or 0.64 to 0.66 for the cover 20, and 0.71 to 0.78 or 0.74 to 0.76 for the cover 21. The length (in the up/down direction in FIGS. 4 and 6) of the front, middle and rear panels of the covers 20 and 21 is typically about 54 cm to 66 cm (nominally 60 cm) and 45 cm to 55 cm (nominally 50 cm). In a size Extra Large design, the side panels 30 of the cover may be up to 110 cm with a nominal side panel/front panel width ratio of about 0.72.

The slit 28 and the length of the side panels 30 helps to prevent displacement of the installed cover when the doors are opened and closed. This also helps to avoid pulling the window inserts out and off the doors while the cover is in use.

Figure 10:
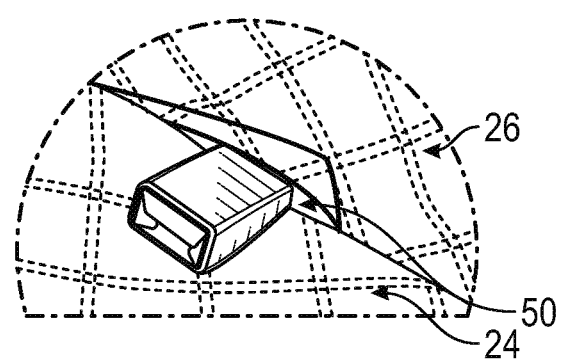
FIG. 10 is a perspective view of a seat belt buckle inserted through a slot in the cover of FIG. 7.

As shown in FIG. 10, slots or openings 50 may be provided through the cover 20 or 21 at or near the rear lateral fold line 54 to allow a seat belt buckle or clip of the seat belt to extend through the cover. This allows the seat belts to be used with the cover 21 in place in the vehicle.

Figure 8:
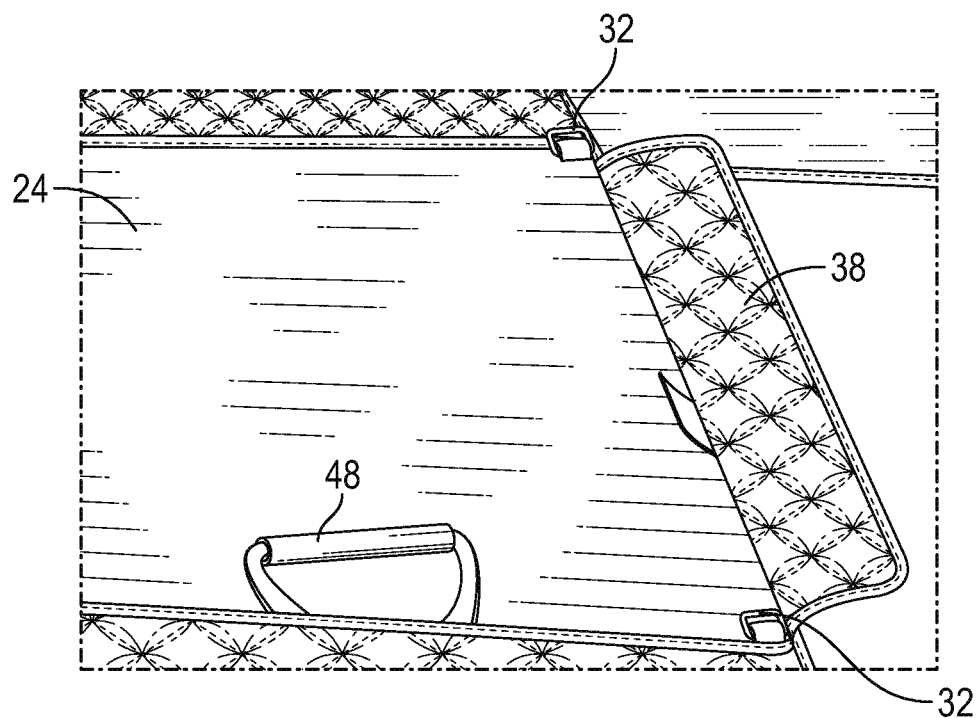
FIG. 8 is an enlarged view of the right side of the middle panel of the cover shown in FIG. 6.

As shown in FIGS. 7 and 8, rings 32 may be attached at or near the front and/or rear corners of the middle panel 24.

In this case, separate ring straps 72 may be routed through one or more of the rings 32 to further secure the cover 21 in place in the vehicle. The rings 32 may be rectangular loop metal rings pivotally sewn onto the cover 21. The slots 50 and rings 32 may of course also be used on the cover 20 shown in FIGS. 1-5. Referring to FIGS. 5, 7 and 9, a first attachment strip 68 is provided on each side panel 30 near the top edge 23 of the cover 20, 21. The first attachment strip 68 may be one side of Velcro® hook and loop tape adhered, sewn, or otherwise attached to the side panel 30. The second attachment strip 66, or the other side of the Velcro strip, is on the window insert 62 described below.

Figure 15:
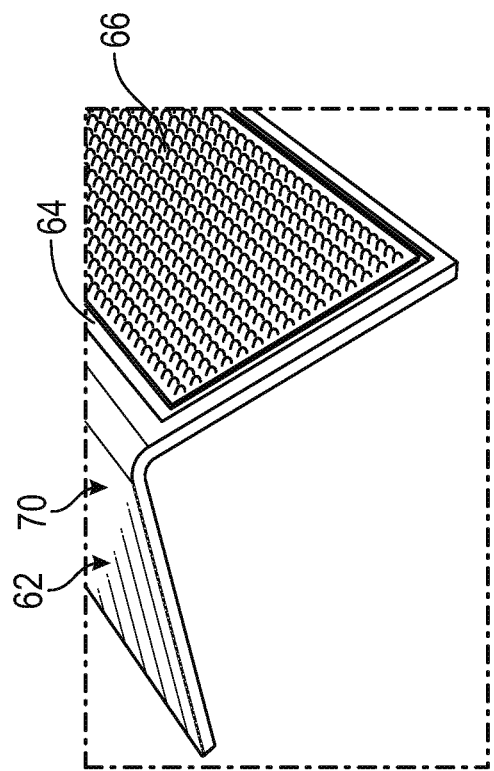
FIG. 15 is an end perspective view of the completed window insert of FIG. 14.

FIGS. 11-15 show a window insert 62 which is inserted into a window opening (between the door window glass and the interior of the vehicle) to hold the side panel 30 alongside the vehicle door. The window insert 62 includes an angle piece 70 having a first leg approximately perpendicular to a second leg, as shown in FIG. 15. The legs may be equal in length, or the first leg may be longer than the second leg. For example, the first leg may be 2.5 cm (1 inch) and the second leg may be 5 cm (2 inches). A recess 64 is provided on the outer side of the second leg. The second attachment strip 66 is attached to the angle piece 70 in the recess 64, e.g., with an adhesive. The angle piece 70 may be plastic or vinyl, typically having a length of 40 to 51 cm (16 to 20 inches). Depending on the vehicle, one or two window inserts 62 at each window. Or in some cases a single long window insert may be used or provided as a cut-to-length option.

Figure 11:
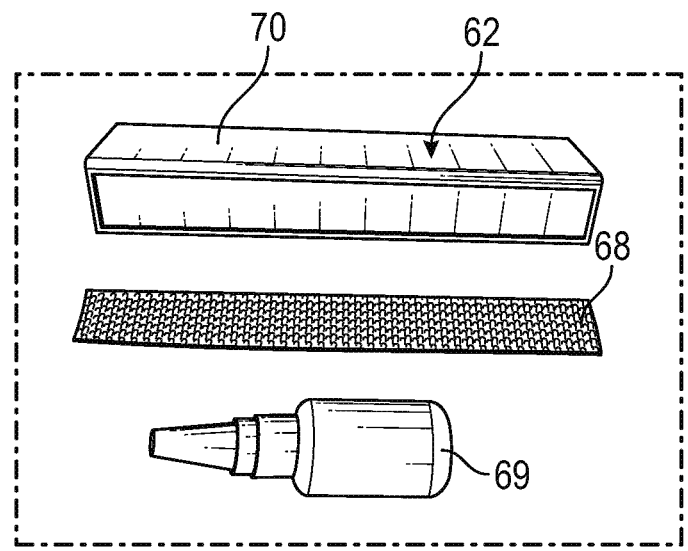
FIG. 11 is a perspective view of a window insert kit.
Figure 12:
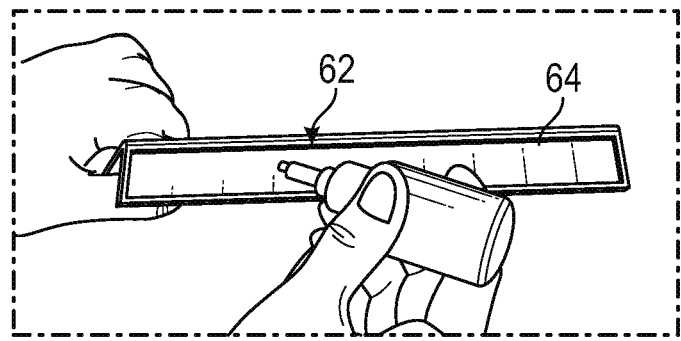
FIG. 12 is a perspective view of a first step for assembly of the window insert kit.
Figure 13:
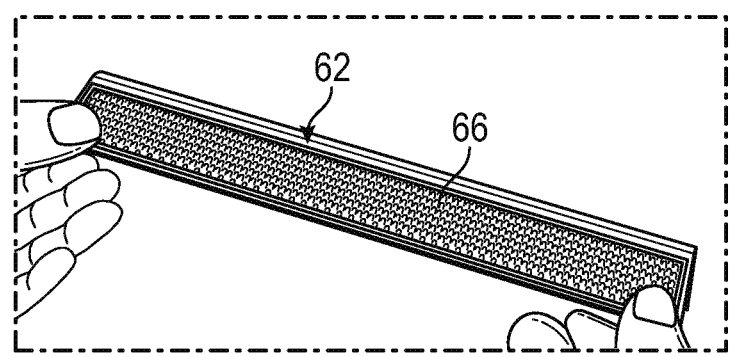
FIG. 13 is a perspective view of a second step for assembly of the window insert kit.
Figure 14:
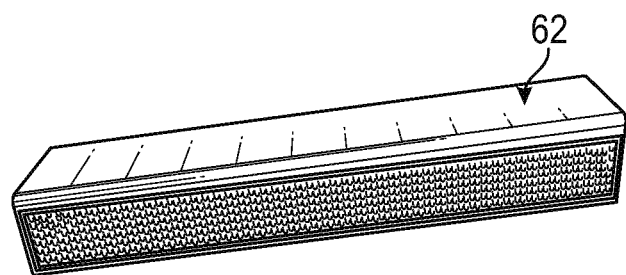
FIG. 14 is a perspective view of an assembled window insert.

A window insert kit may be provided with the cover 20, 21 including multiple angle pieces 70, multiple second attachment strips 66, and a bottle of adhesive, as shown in FIG. 11. Alternatively, the adhesive may be omitted with a second attachment strip attached to each angle piece 70 during manufacture.

Figure 19:
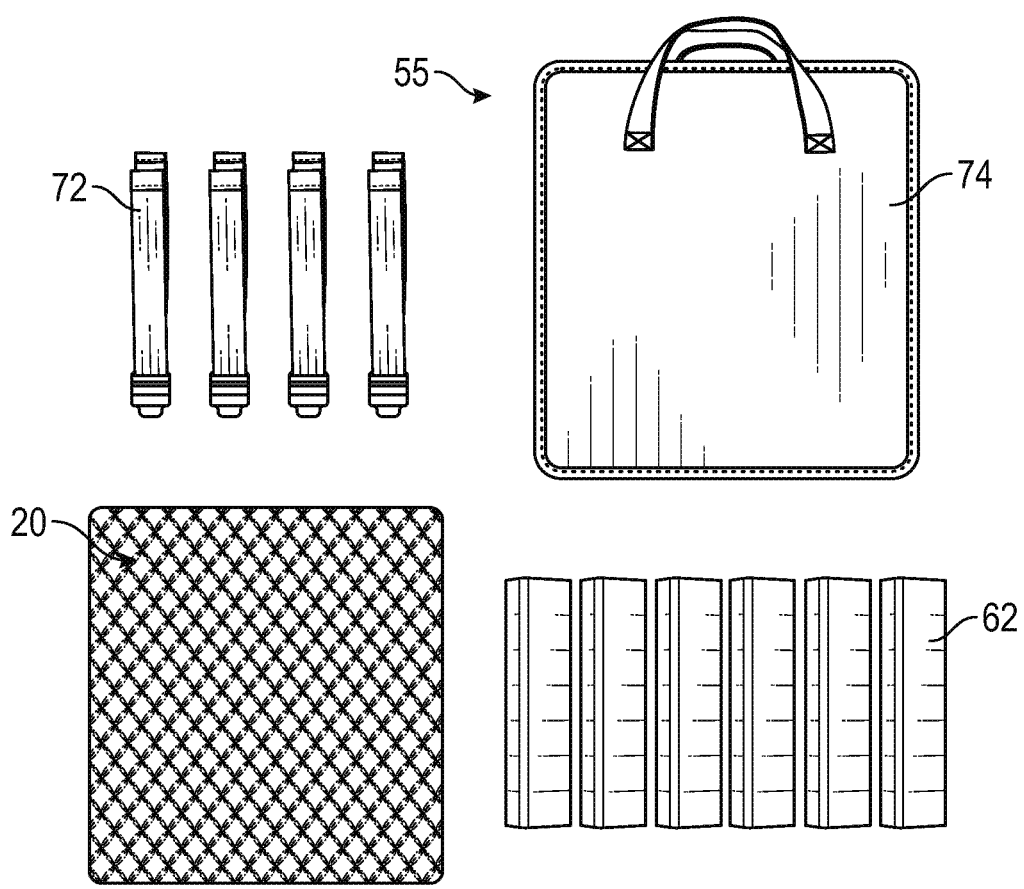
FIG. 19 is a plan view of an unpackaged cover kit.

Referring to FIG. 19, the cover 20, 21 may be provided with a cover kit 55 which includes a cover 20 or 21, a window insert kit, four ring straps 72, and a storage and carrying case 74. The cover 20, 21 may be installed in a vehicle as follows. The cover is unfolded and the middle panel 24 is positioned on the seat or horizontal surface of the interior of the vehicle, as shown in FIG. 1. The front panel 22 is placed up adjacent to the rear of the front seats and the front straps are looped around the front headrest posts. The side flaps 38 are positioned at the sides of the horizontal surface, in a near vertical orientation. The rear panel 26 is placed adjacent to the seat back with the rear straps placed around the rear headrest posts, as shown in FIG. 3. If the rear seat is folded up, as in FIG. 1, then the lateral strap 46 may be used and routed over and around the sides and top of the folded rear seat, also as shown in FIG. 1. The anchor tubes 48, if used, may be pushed between the seat bottom and the seat back. The ring straps 72, if used, may be routed through the rings 32 and around the seat back or the seat bottom.

Figure 18:
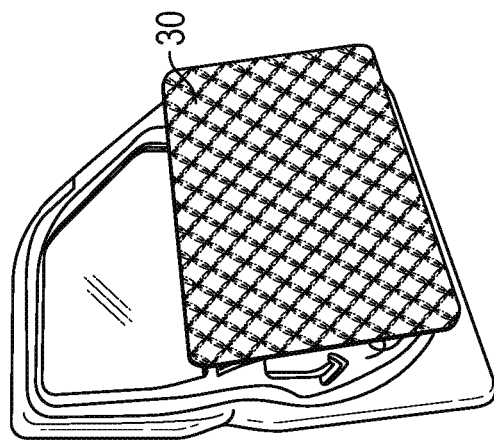
FIG. 18 is a perspective view of the completed installation of the window insert and left side door panel.
Figure 17:
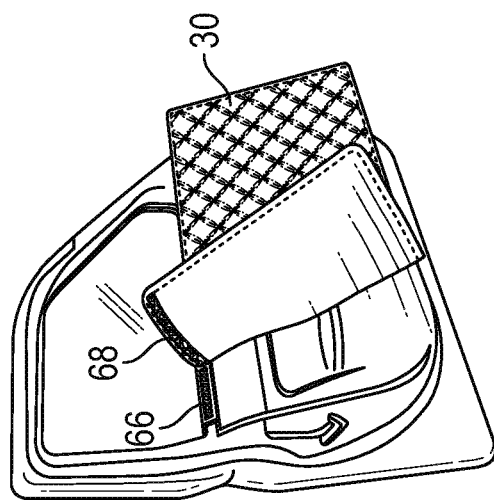
FIG. 17 is a perspective view of a second step of installing the window insert of FIG. 14, and the left side door panel of the cover of FIGS. 1-5.
Figure 16:
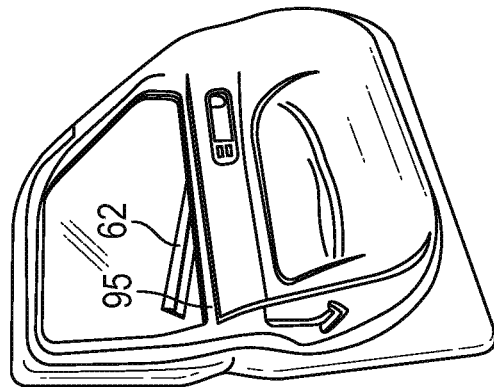
FIG. 16 is a perspective view of a first step of installing a window insert.

Turning to FIGS. 16-18, the first leg of a window insert 62 is inserted between the window glass of the rear vehicle door and the interior window molding or sweep strip, with the second leg above or resting on top of the door sill. In some cases, it may be helpful to slide the window insert back and forth and slightly push against the window if needed.

The first attachment strip 68 on the side panel 30 is aligned over and pressed down onto the second attachment strip 66 on the second leg of the window insert 62, to hold the side panel 30 alongside the interior of the rear vehicle door, as shown in FIGS. 2 and 18. The same steps are followed for the right side vehicle rear door. As shown in FIGS. 1 and 2, with the cover 20, 21 installed, substantially all interior surfaces of the vehicle subject to usual pet damage, or other damage, soiling, etc. from pets, loading/unloading cargo, etc. are covered. As shown in FIG. 2, the rear doors 19 can be fully opened and closed without removing or displacing the cover 20, 21.

Figure 20:
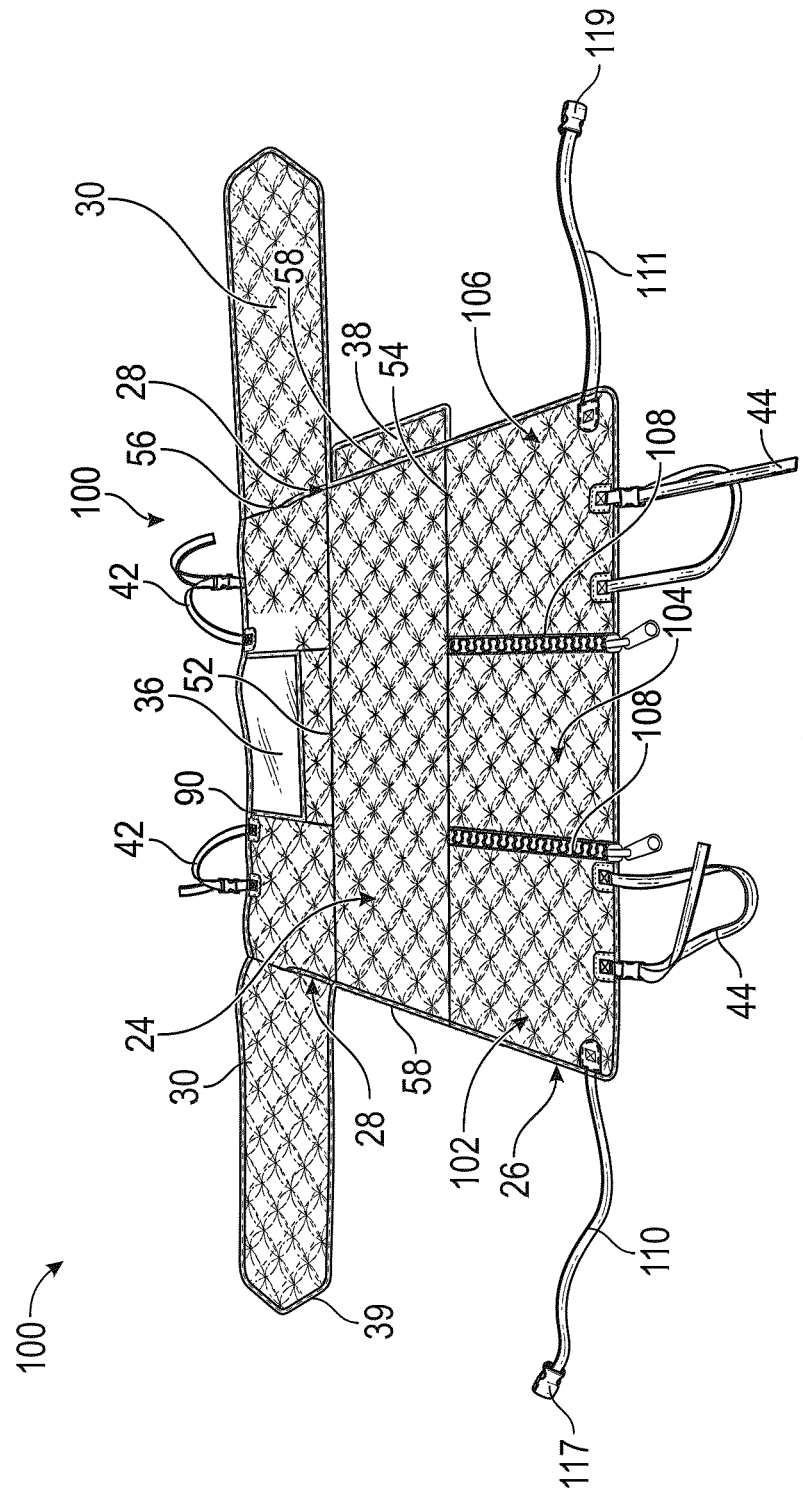
FIG. 20 is a top perspective view of another embodiment for use in vehicles having middle or rear seats that fold up.

FIGS. 20-25 show an alternative cover 100 which may be used in a vehicle having split or bench fold down seats. As shown in FIG. 20, the cover 100 may be the same as the covers 20 or 21 described above except for the following differences. As shown in FIG. 20, the rear panel 26 is split into first, second and third sections 102, 104 and 106 which are separable from each in the sense that each one can independently fold towards and away from the middle panel 24 (although all three are permanently attached to the rear edge of the center panel 24 or provided as extensions of the center panel). In the example shown, the three sections are attached together by split seat zippers 108 extending longitudinally across the rear panel 26 from the rear edge of the rear panel to the middle panel 24.

The cover 100 has two top seat straps 110, 111 instead of the lateral strap 46 shown in FIGS. 4 and 7. The first top seat strap 110 has a plug 117 and the second top seat strap 111 has a receptacle 119, or vice versa. The length of the two top seat straps 110, 111 is adjustable (e.g., using sliding length adjusters). The top seat straps 110, 111 are attached to the rear panel 26 near the corners of the rear panel, typically 2-16 cm or 12-14 cm in from the rear and side edge of the rear panel 26.

Figure 21:
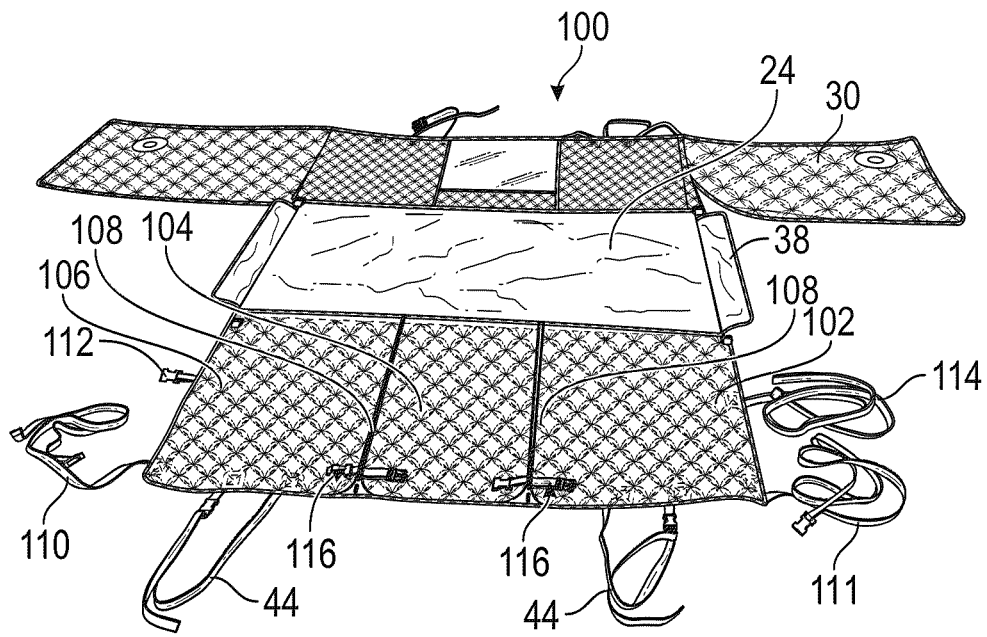
FIG. 21 is a bottom perspective view of the cover shown in FIG. 20.
Figure 22:
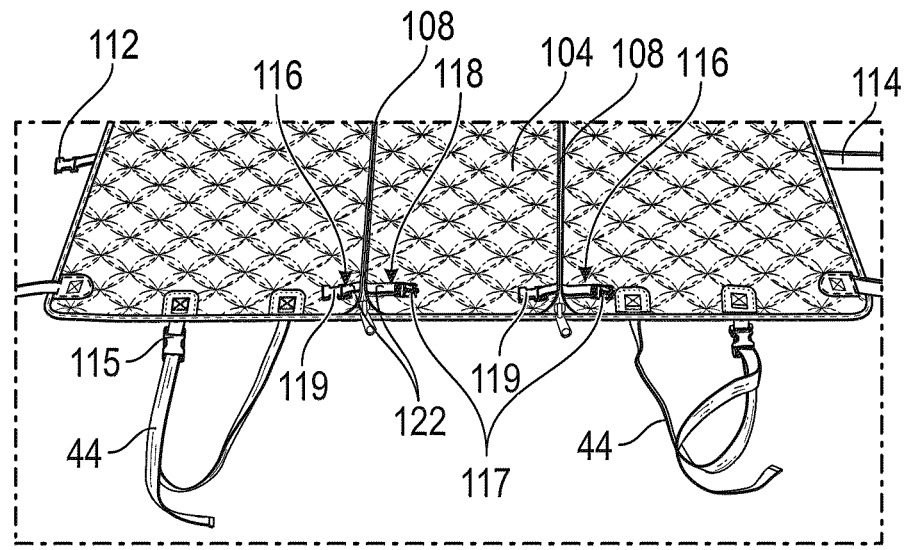
FIG. 22 is an enlarged detail of features shown in FIG. 21.

Referring to FIGS. 21 and 22 showing the bottom of the cover 100, first and second pairs of split seat top clips 116 are attached to the bottom side of the cover 100. The top seat clips 116 of each pair are on opposite sides of each zipper 108, at intermediate attachment points adjacent to each zipper 108 and the rear edge of the rear panel 26. The split seat top clips 116 may each be attached to the rear panel 26 using a short tether 122 having an inner end attached adjacent to or at the rear edge of the rear panel 26. Each split seat top clip is either a plug 117 or a receptacle 119, which together provide a so-called side release buckle, for attaching the top seat straps 110, 111 to the split seat top clips 116.

Figure 23:
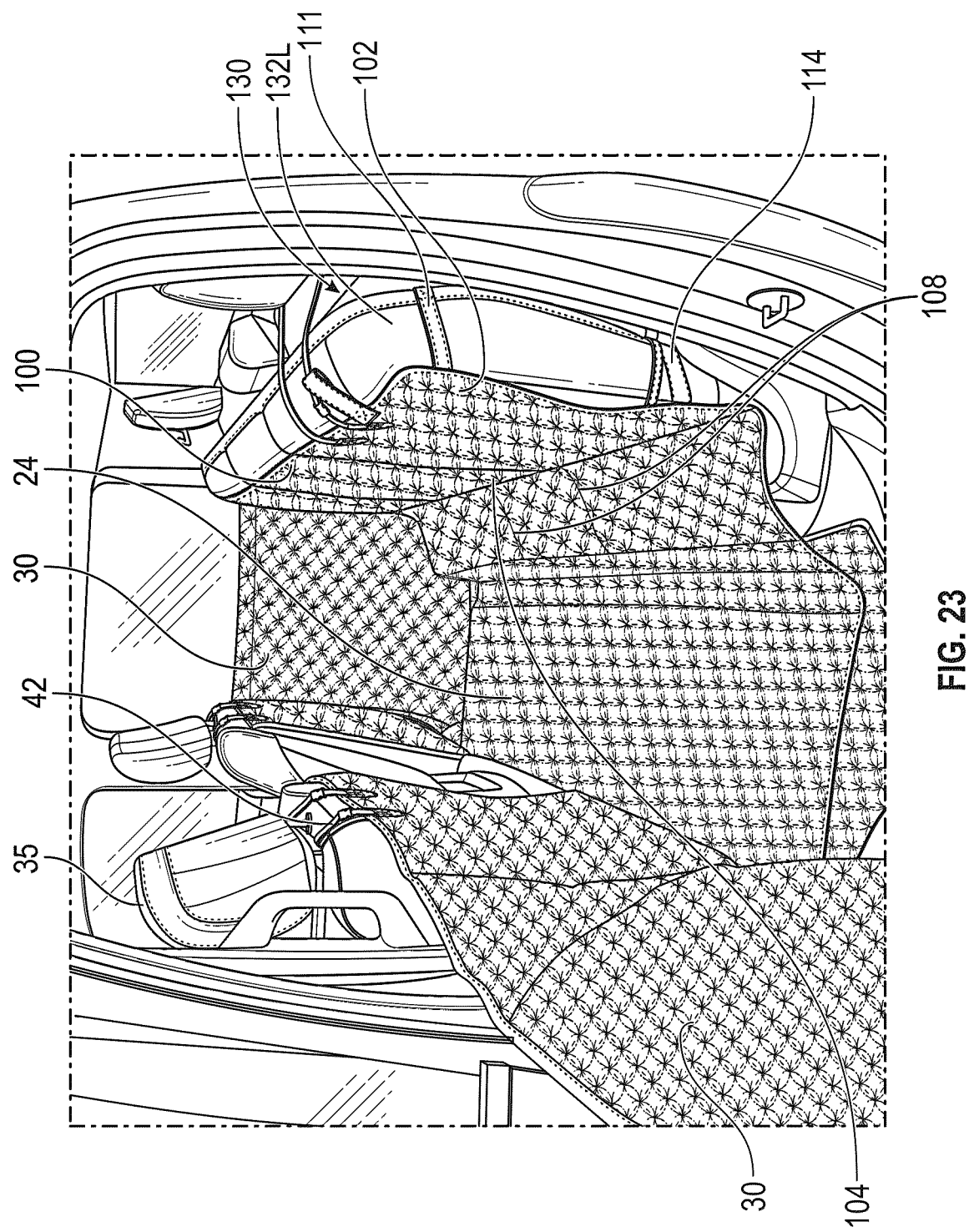
FIG. 23 is a perspective view of installation of the cover shown in FIGS. 20-22 now installed on a folding rear vehicle seat, with both sides of the seat in the folded up position.
Figure 24:
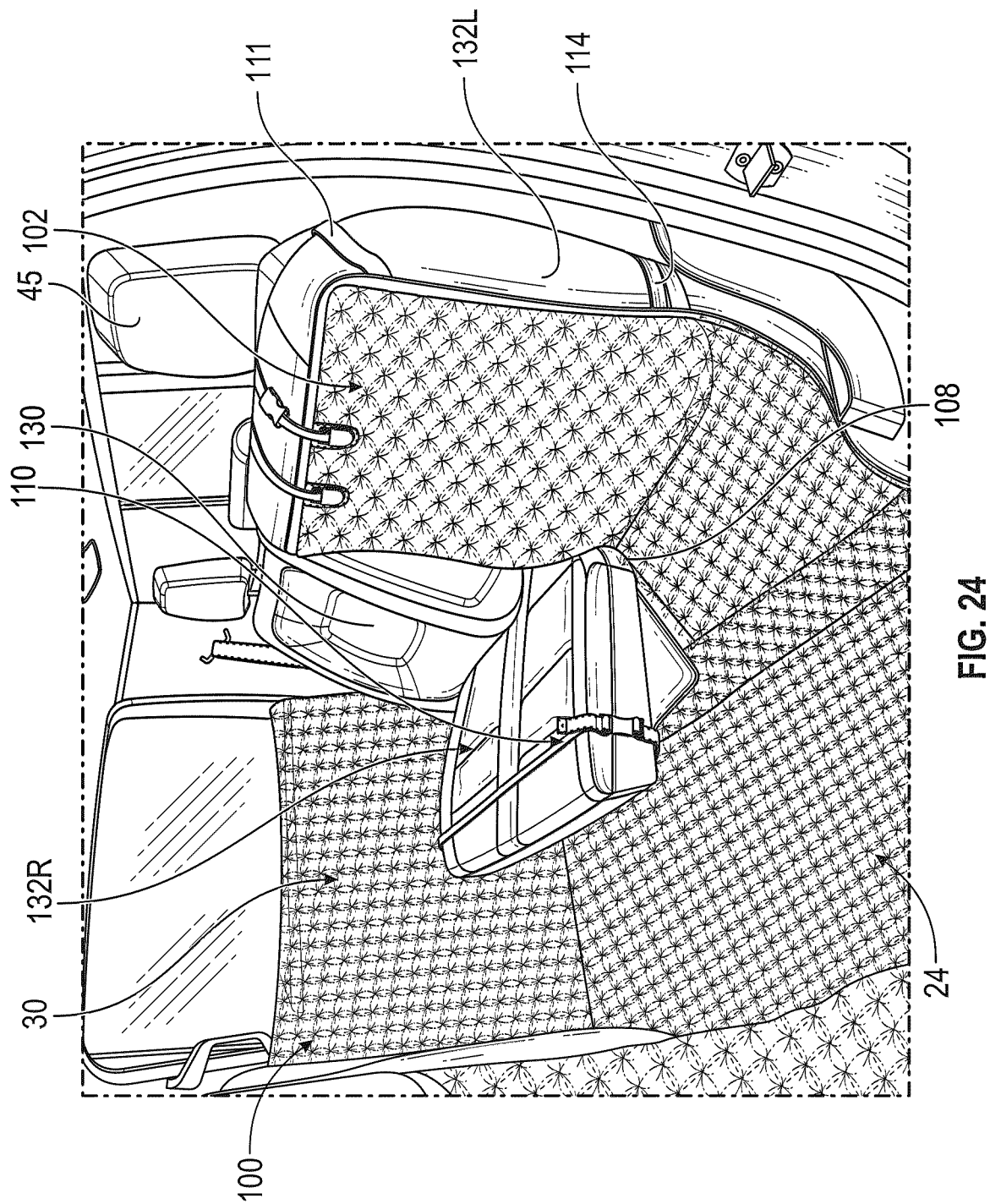
FIG. 24 is a perspective view of installation of the cover shown in FIGS. 20-22 now installed on a folding rear vehicle seat, with the right side of the split seat in the down position and the left side of the split seat in the folded up position.

Referring to FIG. 23, when installed on a split seat with both sides of the split seat folded up, the cover 100 covers the exposed bottom surface of the seat cushions 132L, 132R of the middle or rear seating of the vehicle. The cover 100 does not cover the top surfaces of the seat cushions which are folded up against the seat back 130 and are not exposed. As shown in FIG. 24, the right side seat cushion 132R is folded down, and the (left side) zipper 108 is unzipped, to allow the top surface of the seat cushion 132R to remain uncovered for use by a passenger. At the same time, the cover 100 covers the other interior surfaces to protect them from pet damage. If both seat cushions are folded down, then the sections 102, 104 and 106 may remain in place on the bottom surface of the seat cushions with both zippers 108 zipped or unzipped. Alternatively, in this case the rear panel 26 may be left unattached to seat cushions 132L, 132R, and optionally rolled or folded up on the floor under the seat cushions.

As with the covers 20 and 21, the cover 100 may optionally have seat belt openings. As shown in FIGS. 20-23 and 25, the cover 100 may be substantially continuous without any through holes or openings, other than the optional mesh window 36, if used.

As shown in FIG. 24, the split seat zippers 108 can unzip to allow split seats or an un-split bench seat to fold up and down without removing the cover 100. The bottom seat strap 114 wraps around the seat back 130 and connects to a bottom seat clip 112 on the opposite side of the rear panel 26, to hold the rear panel sections more tightly against the bottom surface of the seat cushions 132L. 132R. The bottom seat strap 114 may alternatively extend over the seat cushions, in front of the seat backs 130. As shown in FIGS. 23 and 24, the bottom seat strap 114 holds the sides of the rear panel 26 against the underside of the seat cushions. With the seat folded up as shown in FIG. 24, the top or rear edge of the rear panel 26 is held against the underside of the seat cushion 132L using headrest straps 44 wrapped around the rear headrests 45. The headrest straps 44 which include a side-release buckle, are released to fold the seat cushion 132L down. In some designs, the bottom seat strap 114 may be omitted.

Each of the two top seat straps 110, 111 can attach to either split seat top clip 116. This allows the two top seat straps 110, 111 to attach to each other for an un-split bench seat, or to attach to either of the split seat top clips 116, i.e., having a plug 117 or a receptacle 119, for use with split seats. This also provides a substantially mistake proof design.

As shown in FIGS. 20-25, the cover 100 allows either or both seat cushions 132L, 132R to be folded up or folded down, while the cover 100 remains in place. The cover 100 may be used with seats that split on the right side or the left side, or with an un-split bench seat. The bottom seat strap 114, if used, stays attached with the seat cushions are folded up or down and helps to keep the cover 100 securely attached. With an un-split bench seat, a top seat strap 110 and/or 111 wraps around the top of the bench seat cushion when folded up. The top seat straps 110, 111 stay attached to the seat cushions while allowing it to fold up and down.

Figure 25:
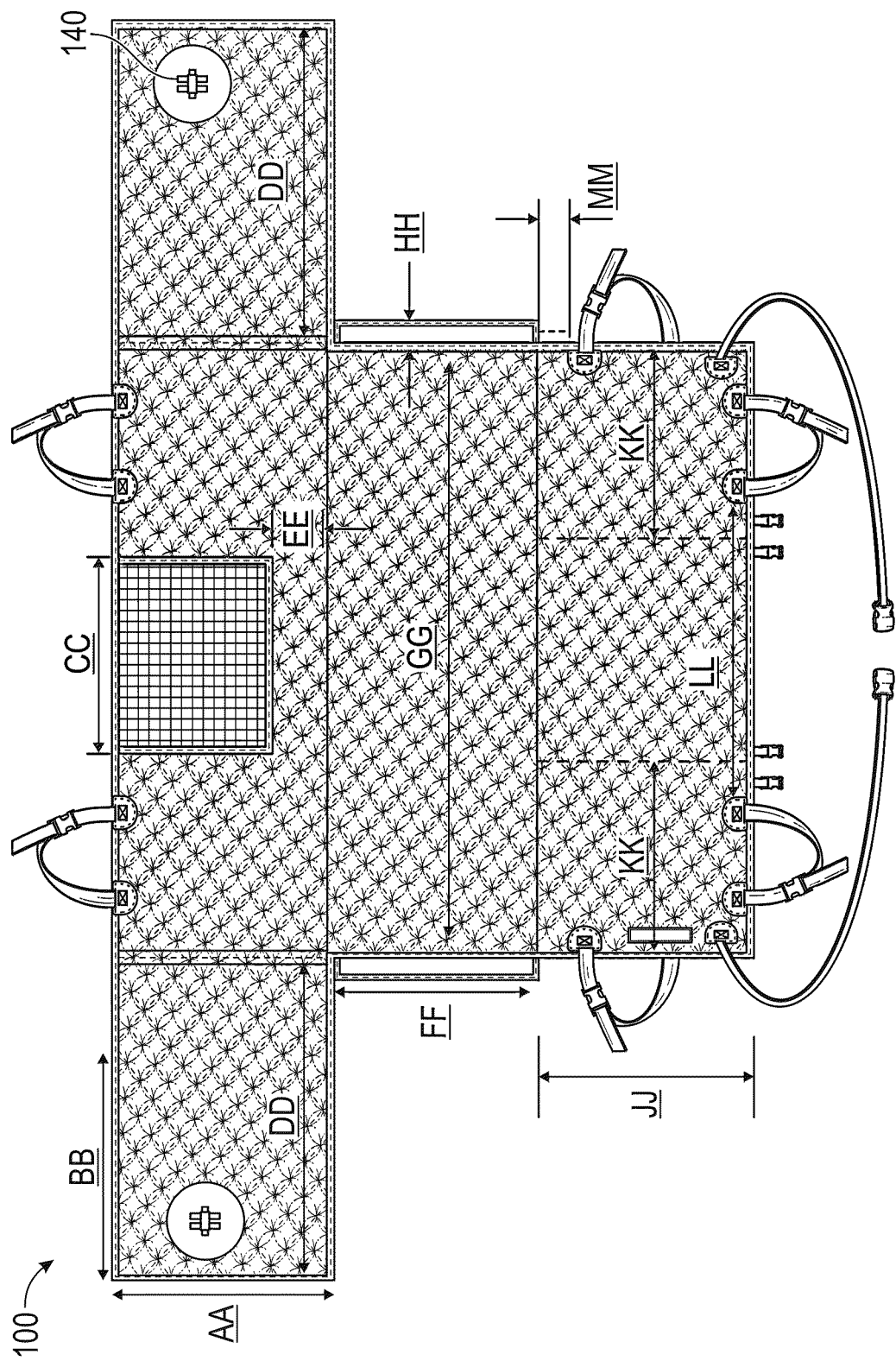
FIG. 25 is a plan view of the cover shown in FIGS. 20-24 showing representative dimensions.

FIG. 25 shows representative dimensions of the cover 100. These dimensions, as listed in Table 1 below, may apply proportionally as well to the covers 20 and 21. Logos 140 may be provided on the side panels 30, where they are visible in use.

Many vehicles, specifically pickup trucks, have fold-up middle and/or rear seats. In these vehicles, the seat bottom or seat cushions 132L, 132R fold or pivot upwardly to a position adjacent to or in contact with the seat back 130, as shown in FIG. 24. This provides increased cargo space. The sections 102, 104 and 106 of the rear panel 26 are dimensioned to approximately match the dimensions of seat cushions, as shown in FIG. 23. For example, dimension KK in the table below may be about 55 cm, approximately equivalent to the width of the driver's side split seat in a so-called 60/40 split seat. The lateral locations of the zippers 108 may be selected to match the split seat design of specific vehicles. In some designs, the rear panel 26 may be divided into only two sections connected by a single zipper 108. The design features of the cover 100 described above may also be applied for use in a vehicle having three or four separately folding seat cushions.

| FIG. 25 DIMENSIONS | CENTIMETERS |
| --- | --- |
| AA | 80 |
| BB | 75 × 4 VELCRO STRIPS ON BOTTOM |
| CC | 48 |
| DD | 110 |
| EE | 23 |
| FF | 80 |
| GG | 153 |
| HH | 10 |
| JJ | 80 |
| KK | 55 |
| LL | 80 |
| MM | 43 |

Elements described above as being attached may alternatively be made integral with the cover, or may be attached by adhesives, stitching, fasteners, or by extending through an opening in the cover. Attached means permanently attached in ordinary use, e.g., by sewing, stitching, heat pressed, etc. Any of the features of the cover 20 may be used in the covers 21 and 100, and vice versa. In addition to the ranges described, nominal dimensions may vary by up to 5% of nominal. As used here, about means +/−5%. The zippers described above may be replaced with other devices, such as Velcro hook and loop tape, snaps, buttons, etc. Elements described as on the left or right sides, or as plugs and receptacles, can of course be reversed. The term clip as used here means either component of an attachment device, such as a side release clip, or the entire attachment device. The clips described above may of course be replaced by other fasteners, such as hook and loop, belt/buckles, etc. Longitudinal means in the top to bottom of the page direction as the cover is shown in FIGS. 4, 6, 20 and 25. Lateral means the direction perpendicular to the longitudinal direction or axis.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A cover for an interior of a vehicle, comprising:
    a middle panel having front, rear, left and right edges;
    a front panel attached to the front edge of the middle panel;
    a rear panel attached to the rear edge of the middle panel, the rear panel having independently foldable first, second, and third sections;
    a left side door panel attached to an upper portion of a left side of the front panel;
    a right side door panel attached to an upper portion of a right side of the front panel;
    a left window insert attachable to the left side door panel; and
    a right window insert attachable to the right side door panel, each window insert configured to be inserted into a window opening of the vehicle.

2. The cover of claim 1, further including a first zipper attaching the first section to the second section of the rear panel, and a second zipper attaching the second section to the third section of the rear panel.

3. The cover of claim 2, further including first and second pairs of split seat top clips, the first and second zippers in between the split seat top clips of the first and second pairs, respectively.

4. The cover of claim 3, wherein the cover has a top and a bottom and the split seat top clips are on the bottom.

5. The cover of claim 1, wherein the front, middle and rear panels are rectangular, with each panel comprising a plurality of layers heat pressed together.

6. The cover of claim 1, further including a left flap attached to a left side of the middle panel and a right side flap attached to a right side of the middle panel.

7. The cover of claim 1, further including:
a left front strap attached to the front panel; and
a right front strap attached to the front panel and spaced apart from the left front strap.

8. The cover of claim 7, further comprising a mesh window in the front panel in between the left and right front straps.

9. The cover of claim 1, further including first and second top seat straps attached on opposite sides of the rear panel.

10. The cover of claim 1, further including gaps between a lower end of the middle panel and a lower end of the left and right side door panels.

11. The cover of claim 1, wherein the panels are configured to allow doors of the vehicle to open and close without displacing the cover, when the left and right side door panels are attached to left and right side rear doors of the vehicle, and wherein the rear panel is configured to allow seats of the vehicle to fold up or down, without displacing the cover.

12. The cover of claim 1, wherein each panel comprises a top cloth layer having a waterproof coating, a fill middle layer, and a cloth bottom layer, the layers heat pressed together.

13. The cover of claim 12, further including non-slip grip areas on a perimeter of the cloth bottom layer to reduce sliding movement.

14. A cover for an interior of a vehicle, comprising:
front, middle and rear areas;
the rear area having independently foldable first and second sections;
a zipper coupling the first section to the second section;
first and second split seat top clips on opposite sides of the zipper;
first and second top seat straps attached on opposite sides of the rear area;
a left side door panel attached to an upper portion of a left side of the front area; and
a right side door panel attached to an upper portion of a right side of the front area.

15. The cover of claim 14, further including a left window insert attachable to the left side door panel and a right window insert attachable to the right side door panel, each window insert configured to be inserted into a window opening of the vehicle, the cover having gaps between a lower end of the middle panel and a lower end of the left and right side door panels.

16. The cover of claim 14, wherein the cover has a top and a bottom and the split seat top clips are on the bottom and the front, middle and rear area are rectangular, with each area comprising a plurality of layers heat pressed together.

17. The cover of claim 16, further including a left flap attached to a left side of the middle area and a right side flap attached to a right side of the middle area, and a mesh window in the front area in between the left and right front straps.

18. A method for protecting an interior of a vehicle, comprising:
holding up a first main portion of the cover adjacent to the back of the front seats of the vehicle;
positioning a second main portion of the cover over the floor of the vehicle;
moving a folding seat of the vehicle into a folded-up position;
securing a third main portion of the cover to the underside of the folding seat of the vehicle;
inserting first and second window inserts into first and second window slots in first and second rear doors of the vehicle; and
attaching first and second side portions of the cover joined to the first main portion to the first and second window inserts, respectively.

19. The method of claim 18, further including routing a bottom seat strap over a top surface of the folding seat.

20. The method of claim 18, wherein the first main portion is held up by routing first and second front straps of a cover around first and second headrest posts, respectively.

21. The method of claim 18, wherein the third main portion is secured by routing left and right top seat straps over the top surface of the folding seat to left and right intermediate attachment points of the third main portion.

22. The method of claim 18, wherein the folding seat is a split folding seat having a first seat and a second seat, the method further comprising unzipping a zipper attaching the first section to the second section, and folding the first seat into a down position, without displacing the cover.

* * * * *